United States Patent
Ma et al.

(10) Patent No.: US 9,773,303 B2
(45) Date of Patent: Sep. 26, 2017

(54) PREDICTION SYSTEM FOR SHORT-TERM SOLAR IRRADIANCE AND METHOD FOR OPERATING THE SAME

(71) Applicant: INSTITUTE OF NUCLEAR ENERGY RESEARCH, ATOMIC ENERGY COUNCIL, EXECUTIVE YUAN, R.O.C., Taoyuan (TW)

(72) Inventors: Chih-Chieh Ma, Taoyuan (TW); I-Tao Lung, Taoyuan (TW); Wan-Li Hsu, Taoyuan (TW)

(73) Assignee: Institute of Nuclear Energy Research, Atomic Energy Council, Executive Yuan, R.O.C., Taoyuan (TW)

( * ) Notice: Subject to any disclaimer, the term of this patent is extended or adjusted under 35 U.S.C. 154(b) by 182 days.

(21) Appl. No.: 14/932,190

(22) Filed: Nov. 4, 2015

(65) Prior Publication Data
US 2017/0124694 A1    May 4, 2017

(51) Int. Cl.
G06K 9/00    (2006.01)
G06T 7/00    (2017.01)
H04N 5/225   (2006.01)
H02J 3/38    (2006.01)

(52) U.S. Cl.
CPC ............ *G06T 7/0004* (2013.01); *H02J 3/383* (2013.01); *H04N 5/225* (2013.01); *G06T 2207/30181* (2013.01)

(58) Field of Classification Search
CPC ......... G06T 7/0004; G06T 2207/30181; H02J 3/383; H04N 5/225
USPC .......................................................... 382/100
See application file for complete search history.

(56) References Cited

U.S. PATENT DOCUMENTS

| | | | |
|---|---|---|---|
| 8,655,498 B2* | 2/2014 | Bronicki | G01W 1/10 700/287 |
| 2004/0169770 A1* | 9/2004 | Widener | H04N 5/2251 348/373 |
| 2011/0060475 A1* | 3/2011 | Baldwin | G01W 1/10 700/295 |
| 2011/0067750 A1* | 3/2011 | Ueda | F24J 2/38 136/246 |
| 2011/0220091 A1* | 9/2011 | Kroyzer | F24J 2/38 126/572 |
| 2012/0121125 A1* | 5/2012 | Dimov | G01W 1/12 382/103 |
| 2013/0013233 A1* | 1/2013 | Murakami | H02J 3/38 702/60 |
| 2013/0046416 A1* | 2/2013 | Osako | G05F 1/67 700/298 |
| 2013/0152997 A1* | 6/2013 | Yao | F24J 2/40 136/246 |

(Continued)

*Primary Examiner* — John Strege
(74) *Attorney, Agent, or Firm* — Rosenberg, Klein & Lee

(57) ABSTRACT

The present invention relates to a prediction system for short-term solar irradiance and the method for operating the same. A total sky imager is adopted for acquiring sky images. After imaging, the images are operated for calculating the shading value of sunlight according to the sky images. Then, according to the shading values of sunlight for different times, the trend value for power generation can be calculated. According to the trend value of power generation, whether to start other power sources via power deployment in the near future can be determined and thus maintaining the stability of the overall power grid.

6 Claims, 2 Drawing Sheets

(56) References Cited

U.S. PATENT DOCUMENTS

| | | | |
|---|---|---|---|
| 2013/0166266 A1* | 6/2013 | Herzig | G01W 1/12 703/6 |
| 2013/0223676 A1* | 8/2013 | Guan | G06T 7/55 382/103 |
| 2014/0035374 A1* | 2/2014 | Oka | G06Q 50/06 307/52 |

* cited by examiner

PREDICTION SYSTEM FOR SHORT-TERM SOLAR IRRADIANCE AND METHOD FOR OPERATING THE SAME

FIELD OF THE INVENTION

The present invention relates generally to a prediction system and the method for operating the same, and particularly to a prediction system for short-term solar irradiation and the method for operating the same applicable to solar power generation predicating short-term variations in power generation, and thus sparing time for raising power generation using backup power sources and maintaining power stability in the overall power grid.

BACKGROUND OF THE INVENTION

The fundamental method for solar power generation is to illuminate the sunlight on the surface of solar cells. By using this power generating system, one critical factor is to enhance the absorption efficiency of the solar energy. The solar angle varies periodically over the year at different geographical locations; it also changes over the day. Thereby, tracking the location of the sun and the solar angle for acquiring the maximum irradiation has become the most important subject of solar power generation.

In addition to long-term observation of power generation, the method of short-term prediction has been valued increasingly. Because the solar irradiance received by the light-receiving surface on the solar module of a solar tracker is influenced by cloud clusters and varies significantly in a short time, the power supply by a solar power plant becomes unstable. The support by other power plants is required for maintaining the stability of the overall power generation. Nonetheless, when to increase the power generation by thermal or nuclear power generation system? How much power generation is required? How the power generation is to sustain? There is still no efficient system for providing information to these questions.

By surveying existing technologies, the China Patent Application Number CN 201410147280.9 provided a prediction method for ultra-short-term photovoltaic power generation based on cloud simulation, which built a prediction model by operating the weather data of long-term observations and enabled prediction of the weather condition in the upcoming four hours. Nonetheless, there is an extremely large error between the prediction result and the realistic weather. In addition, the China Patent Application Number CN 201110068898.2 provides an online evaluation method for active power of photovoltaic power generation based on weather information, which included light measurement apparatuses (similar to solar panels) at remote sites. According to the light irradiance on the light measurement apparatuses at the remote sites, the variation of power generation of the solar power plant can be deduced. This method suffers from difficulty in hardware maintenance. Besides, the light irradiance at the remote sites differs from the realistic result at the near site, making the method an inferior method. Furthermore, the U.S. Pat. No. 8,655,498 disclosed a method for combining multiple weather stations and solar tracking arrays. By observing the real-time weather condition surrounding the solar tracking arrays, predictions can be made. Nonetheless, the hardware cost is extremely huge.

SUMMARY

An objective of the present invention is to provide a prediction system for short-term solar irradiance. The solar power plant is set as the center. The sky image above the solar power plant is acquired by using one or more sky imager. The influence of cloud clusters on the sun depends on the thickness thereof and the location with respect to the sun. Thereby, an operating module first sets coordinates to the pixels of the sky image. Next, the ratios of red to blue in the pixels are referred to judge the thickness of the cloud clusters. Finally, by referring to the distance between the cloud clusters and the sun and to the thickness of the cloud clusters, the shading amount of sunlight can be calculated. Then the trend of the variation of the shading amount of sunlight is used for predicting power generation. Accordingly, sufficient buffer time is acquired for deploying power generation.

Another objective of the present invention is to provide a prediction system for short-term solar irradiance, which can overcome the drawback of unstable power generation in a solar power plant due to variation in solar irradiance. By using the complementary concept of the power grid, the stability of the whole power supplying system can be maintained.

Still another objective of the present invention is to provide a prediction system for short-term solar irradiance, which can detect cloud clusters within tens to hundreds of kilometers of the solar power plant according to the distribution and amount of clouds imaged by the sky imager. Thereby, sufficient precaution time is spared for starting up the backup power systems or notifying the power plants of other types in the power grid to prepare for increasing power generation.

In order to achieve the above objectives, the present invention discloses a prediction system for short-term solar irradiance, which comprises one or more sky imager, an operating module, and a power deployment module. The sky imager comprises a reflecting unit and an imaging unit. The imaging unit receives the reflected light from the reflecting unit and acquires a plurality of sky images based on an imaging frequency. The operating module is connected with the sky imager and acquires the plurality of sky images. Then it uses the plurality of sky images to calculate and give a plurality of shading values of sunlight, which are used to calculate a plurality of predicted power generation values of a solar power plant. Next, a trend value of power generation is calculated according to the imaging frequency and the plurality of predicted power generation values. The power deployment module is connected with the operating module and uses the trend value of power generation to adjust the power generation of a backup power source.

The operating method comprises steps of: acquiring the plurality of sky images with the imaging frequency using the sky imager; analyzing a plurality of pixels of the plurality of sky images for giving cloud-thickness parameters of the plurality of pixels, and calculating the shading values of sunlight of the plurality of sky images by using the distances between the plurality of pixels and the location of the sun as calculation parameters; calculating a plurality of predicted power generation values using the plurality of shading values of sunlight and a trend value of power generation according to the imaging frequency and the plurality of predicted power generation; and adjusting the power generation of the backup power source according to the trend value of power generation.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
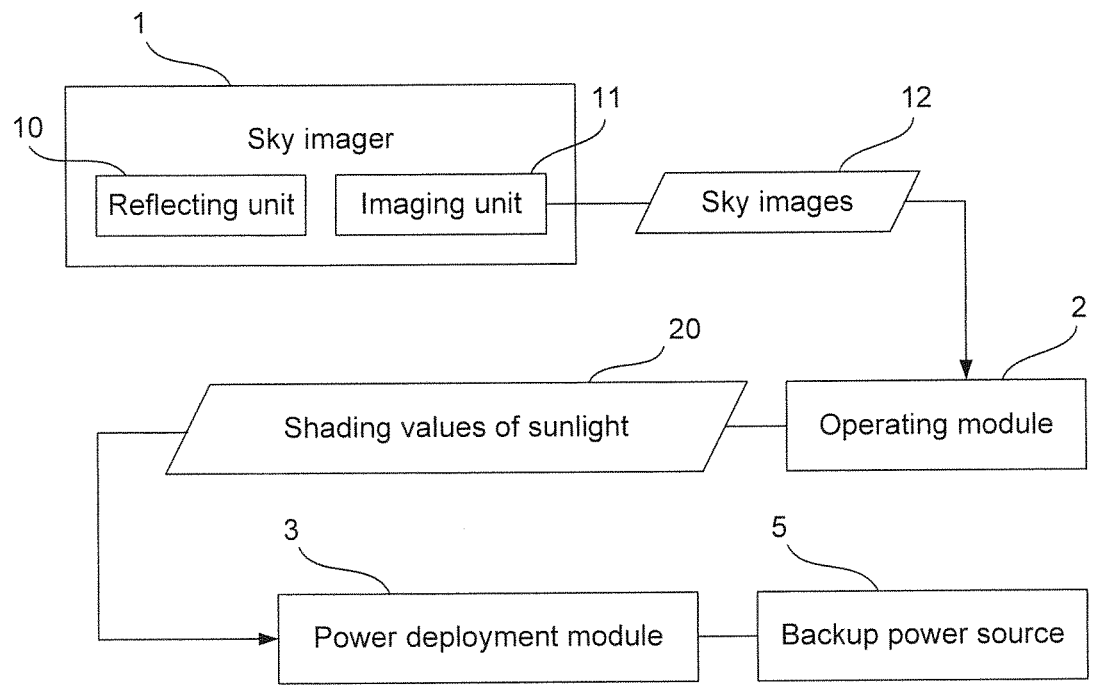
FIG. 1 shows a structural schematic diagram according a preferred embodiment of the present invention.

First, please refer to FIG. 1. The hardware structure of the prediction system for short-term solar irradiance according to the present invention comprises one or more sky imager 1, an operating module 2, and a power deployment module 3. The sky imager 1 comprises a reflecting unit 10 and an imaging unit 11. The operating module 2 is connected with the sky imager 1; and the power deployment module 3 is connected with the operating module 2.

Figure 2:
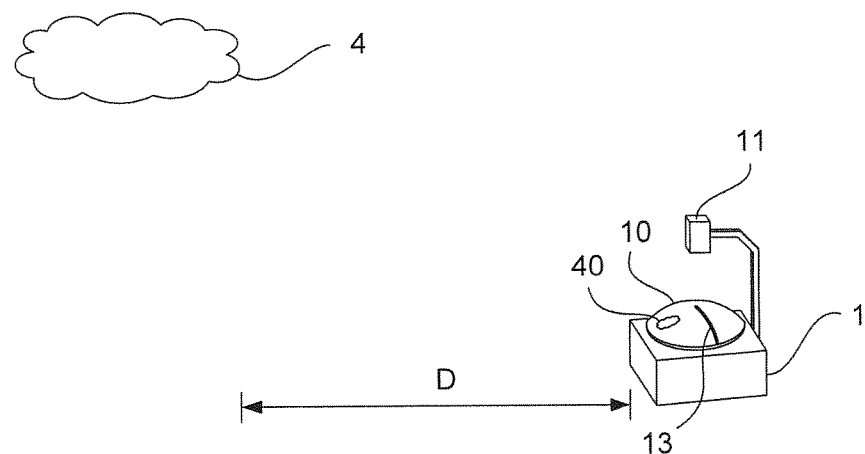
FIG. 2 shows a schematic diagram of a cloud cluster and the sky imager according a preferred embodiment of the present invention.

Please refer to FIGS. 1 and 2. The sky imager 2 according to the present invention uses the curved semi-spherical reflecting unit 10 to acquire the sky condition within tens to hundreds of kilometers of the sky imager 1. In other words, the cloud clusters within the range from the sky vertical to the sky imager 1 to the remote horizontal skyline will be reflected by the reflecting unit 10 and captured by the imaging unit 11 to give the sky images 23. The installation location of the sky imager 1 is at a solar power plant for acquiring the sky images surrounding the solar power plant. The advantage is to replace artificial observations and have real-time observations on the sky all the time and in a large range. As shown in FIG. 2, by the reflection of the reflecting unit 10 of the sky imager 1, the cloud-cluster image 40 of the cloud cluster 4 at a horizontal distance of D, which is approximately 10 kilometers. The cloud-cluster image 40 will be shown in the sly images 12 and used as one of the variables influencing solar irradiance.

Sensing devices age by the ultraviolet light in the sun exposure. In order to prevent damages in the imaging unit 11 during the process of acquiring the sky images 12, the sky imager 1 can further include a sheltering band 13 on the surface of the reflecting unit 10. The sheltering band 13 can move on the surface of the reflecting unit 10 according to the relative location of the sub for blocking direct illumination by the sun and thus avoiding damages in the imaging unit 11 caused by receiving excessively strong light irradiance as well as influence on the imaging quality by the strong light. The imaging unit 11 can be a CCD.

According to a preferred embodiment of the present invention, the total sky imager TSI-880 by the Yankee Company is adopted as the hardware. The model can output the acquired sky images 12 in electronic formats. The data can be transmitted to the operating module 2 via the transmission equipment such as networks. The operating module 2 according to the present invention is hardware equipment having operation capabilities. In addition, in order to have data transmission and operations, the operating module 2 includes a transmission unit, a display unit, an input unit, and a storage unit adopted by general equipment. According to a preferred embodiment, a computer is used as the operating module. Besides, software having general calculation capabilities is used as well.

The operating module 2 receives the sky images 12 taken by the sky imager 1. In order to calculate the shading value of sunlight, the curved sky images 12 are first converted to planar sky images. Then the coordinates are set to the planar sky images according to the pixel composition. In the process of restoring the planar sky images, the curved-surface parameters of the reflecting unit 10 are referred. Because the sky images 12 include the cloud clusters in the sky and the ratios of red to blue in the pixels of the locations of the cloud clusters are within a specific range, according to a fixed threshold, individual pixels can be classified and identified. The pixels having specific red-to-blue ratios are just the images of the cloud clusters shown in the planar sky images.

As described above, because cloud clusters might shelter a portion of the sunlight, maximum solar irradiance might not be maintained at the moment when the sky images 12 are taken. The solar irradiance depends on whether the location of the cloud cluster 4 is close to that of the sun in the sky and whether cloud cluster 4 is thick enough to shelter the sunlight. Accordingly, based on the hardware according to the present invention, the shading value of sunlight 20 at the moment when each sky image 12 is taken is calculated. By referring to the imaging frequency, the trend value of the shading value of sunlight 20 can be found. By using this, the shading value of sunlight in the near future can be predicted. For example, by using the trend value in the past five minutes, the power required in the next five minutes can be predicted and hence the backup power can be prepared in advance.

According to a preferred embodiment of the present invention, the imaging frequency for the sky image is set to be once per minute. Then the red-to-blue ratios of a plurality of pixels of the sky images are analyzed for giving the cloud-thickness parameters of the plurality of pixels. For simplifying the calculation complexity, the cloud-thickness parameters of thinner cloud clusters are excluded, because the influence of those thin cloud clusters on the solar irradiance is insignificant and thus can be neglected. Next, according the preferred embodiment of the present invention, the distances between the plurality of pixels and the sun in the coordinates are used as calculation parameters. In this stage, considering that the influence of the cloud clusters that are away from the sun on the shading value of sunlight is insignificant, the pixels of the cloud clusters away from the sun have lower influence coefficients (approaching 0 in the range between 1 and 0) and those of the cloud clusters closer to the sun have higher influence coefficients (approaching 1 in the range between 1 and 0). The location of the sun in the sky images can be given by calculating and converting the coordinates of the longitude and latitude as well as the orientation for installing the sky imager and the date and time.

After the shading values of sunlight for all pixels are calculated and summed, the shading value of sunlight for the sky image is given. In other words, based on the imaging frequency as described above, the shading value for every specific time interval can be given. Accordingly, the present invention can be used to provide the past trend value for shading value of sunlight. In addition to calculating and giving the predicted power generation of a solar power plant, the predicted power generation can be further used to give the trend value for power generation, which facilitates adjusting the power generation by the backup power source.

The shading value of sunlight is closely related to the power generation, particularly for concentrating solar power generation. If the shading value of sunlight is higher, it means that the power generated by the solar modules in a solar power plant is lower. Because the rated power generation by each solar module is a known and fixed value, by considering the shading value of sunlight and lowering the rated power generation proportionally, the predicted power generation of the solar power generating system can be given. By referring the predicted power generation, the impact of current cloud clusters in the sky on power generation of the solar power plant can be understood.

In conclusion, according to the present invention, by using the sky imager 1 described above and the operating module 2, lowering of power generation can be predicted before the solar power plant is actually influenced. Thereby, the power deployment module 3 connected with the operating module 2 can refer to the shading value of sunlight and increases the power generation of the backup power source 5 when the power generation is predicted lowering. Hence, the stability of power supply can be maintained in the power grid. The backup power source 5 can be power generating equipment in the traditional method, such as diesel power generator or other thermal and nuclear power plants. Normally, some buffer time is required for preparing and operating increases in power generation, the system disclosed in the present invention can be used to earn the precious time.

Figure 3:
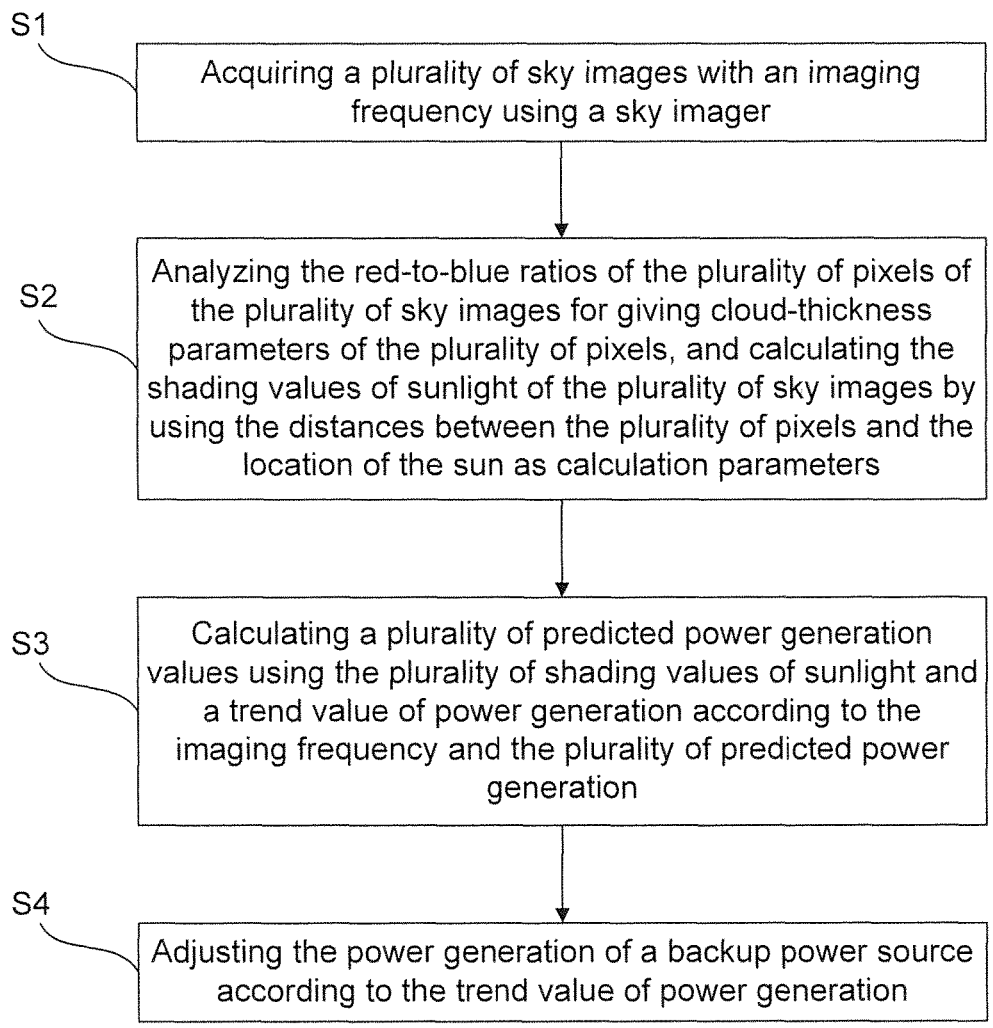
FIG. 3 shows a flowchart according to a preferred embodiment of the present invention.

Based on the above description, please refer to FIG. 3. The method for operating the prediction system for short-term solar irradiance according to the present invention comprises the following steps:

Step S1: Acquiring a plurality of sky images with an imaging frequency using a sky imager;

Step S2: Analyzing the red-to-blue ratios of the plurality of pixels of the plurality of sky images for giving cloud-thickness parameters of the plurality of pixels, and calculating the shading values of sunlight of the plurality of sky images by using the distances between the plurality of pixels and the location of the sun as calculation parameters;

Step S3: Calculating a plurality of predicted power generation values using the plurality of shading values of sunlight and a trend value of power generation according to the imaging frequency and the plurality of predicted power generation; and Step S4: Adjusting the power generation of a backup power source according to the trend value of power generation.

To sum up, the present invention discloses in details a prediction system for short-term solar irradiance. The system uses a solar power plant as the center. A sky imager is used to capture the sky images above the solar power plant. The sky images are then used to give the shading values of sunlight for the sky images. Next, the trend of the past shading values of sunlight is used to predict the shading value of sunlight in the near future. Thereby, sufficient buffer time is earned for deploying power generation and the stability of power supply is provided for the power grid. Consequently, the problem of unstable power supply in solar power generating systems can be solved.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A prediction system for short-term solar irradiance comprising:
   one or more sky imager, including a reflecting unit and an imaging unit, said imaging unit receiving the reflection light from said reflecting unit and giving a plurality of sky images based on an imaging frequency;
   an operational module, connected with said sky imager, acquiring said plurality of sky images, calculating a plurality of shading values of sunlight using said plurality of sky images, calculating a plurality of predicted power generation values of a solar power plant, and calculating a trend value of power generation using said imaging frequency and said plurality of predicted power generation values; and
   a power deployment module, connected with said operating module, and adjusting the power generation of a backup power source using said trend value of power generation.

2. The prediction system for short-term solar irradiance of claim 1, wherein the calculation for said plurality of shading values of sunlight includes using a plurality of pixels of cloud clusters in said plurality of sky images and the distance between said plurality of pixels and an origin as calculation parameters, and said origin is the location of the sun at the moment when said plurality of sky images are taken.

3. The prediction system for short-term solar irradiance of claim 1, wherein said imaging frequency is once per minute.

4. The prediction system for short-term solar irradiance of claim 1, wherein said sky imager is disposed at said solar plant.

5. A method for operating a prediction system for short-term solar irradiance comprising steps of:
   acquiring a plurality of sky images with an imaging frequency using a sky imager;
   analyzing a plurality of pixels of said plurality of sky images for giving cloud-thickness parameters of said plurality of pixels, and calculating shading values of sunlight of said plurality of sky images by using the distances between said plurality of pixels and the location of the sun as calculation parameters;
   calculating a plurality of predicted power generation values using said plurality of shading values of sunlight and a trend value of power generation according to said imaging frequency and said plurality of predicted power generation; and
   adjusting the power generation of a backup power source according to said trend value of power generation.

6. A method for operating a prediction system for short-term solar irradiance of claim 5, wherein after said step of acquiring said plurality of sky images with said imaging frequency using said sky imager, further comprising a step of restoring said plurality of sky images to a plurality of planar sky images.

* * * * *